United States Patent [19]
Fujii et al.

[11] Patent Number: 5,378,442
[45] Date of Patent: Jan. 3, 1995

[54] METHOD FOR TREATING COMBUSTION EXHAUST GAS

[75] Inventors: Masumi Fujii; Taiichiro Suda; Yoshitsugu Hotta; Kenji Kobayashi, all of Osaka; Kunihiko Yoshida; Shigeru Shimojo, both of Amagasaki; Koichi Kitamura; Masami Kawasaki, both of Osaka; Mutsunori Karasaki; Masaki Iijima, both of Tokyo; Touru Seto; Shigeaki Mitsuoka, both of Hiroshima, all of Japan

[73] Assignees: The Kansai Electric Power Co., Inc., Osaka; Mitsubishi Jukogyo Kabushiki Kaisha, Tokyo, both of Japan

[21] Appl. No.: 3,699

[22] Filed: Jan. 13, 1993

[30] Foreign Application Priority Data

Jan. 17, 1992 [JP] Japan .................... 4-006466
Jan. 17, 1992 [JP] Japan .................... 4-006467
Mar. 3, 1992 [JP] Japan .................... 4-045246

[51] Int. Cl.[6] .................... B01D 53/14; B01D 53/34
[52] U.S. Cl. .................... 423/228; 423/229; 423/235; 423/239.1
[58] Field of Search .................... 423/238, 229, 228, 437, 423/352, 420, 235, 239.1

[56] References Cited

U.S. PATENT DOCUMENTS

| | | | |
|---|---|---|---|
| 2,466,183 | 4/1949 | Reed | 423/229 |
| 2,592,762 | 4/1952 | Taylor et al. | 423/229 |
| 2,608,461 | 8/1952 | Frazier | 423/245.2 |
| 3,856,921 | 12/1974 | Shrier et al. | 423/228 |
| 4,002,565 | 1/1977 | Farrell et al. | 210/60 |
| 4,100,257 | 7/1978 | Sartori et al. | 423/226 |
| 4,101,633 | 7/1978 | Sartori et al. | 423/228 |
| 4,129,651 | 12/1978 | Koike et al. | 423/235 |
| 4,217,236 | 8/1980 | Sartori et al. | 252/189 |
| 4,217,238 | 8/1980 | Sartori et al. | 252/192 |
| 4,240,922 | 12/1980 | Sartori et al. | 252/189 |
| 4,240,923 | 12/1980 | Sartori et al. | 252/189 |
| 4,302,431 | 11/1981 | Atsukawa et al. | 423/239 |
| 4,342,735 | 8/1982 | Tsao | 423/420 |
| 4,364,915 | 12/1982 | Proctor | 423/229 |
| 4,624,839 | 11/1986 | Wolcott et al. | 423/229 |
| 5,069,886 | 12/1991 | Frey et al. | 423/235 |

FOREIGN PATENT DOCUMENTS

| | | | |
|---|---|---|---|
| 0062684 | 10/1982 | European Pat. Off. | |
| 0225817 | 6/1987 | European Pat. Off. | |
| 0359991 | 3/1990 | European Pat. Off. | |
| 502596 | 9/1992 | European Pat. Off. | 423/229 |
| 1323297 | 5/1962 | France | 423/420 |
| 2332049 | 6/1977 | France | |
| 48-23270 | 7/1973 | Japan | 423/238 |
| 61-185319 | 8/1986 | Japan | 423/235 |
| 3-293017 | 12/1991 | Japan | |

*Primary Examiner*—Wayne Langel
*Assistant Examiner*—Peter T. DiMauro
*Attorney, Agent, or Firm*—Jacobson, Price, Holman & Stern

[57] ABSTRACT

A method for recovering carbon dioxide by absorbing carbon dioxide present in a combustion exhaust gas using an aqueous alkanolamine solution, comprising the step of bringing a combustion exhaust gas from which carbon dioxide has been absorbed and removed into contact with water containing carbon dioxide. A method for treating a combustion exhaust gas for denitration using ammonia as a reducing agent and for removal of carbon dioxide by absorption with an aqueous alkanolamine solution, which method comprising the steps of recovering ammonia present in the combustion exhaust gas after the carbon dioxide removal, and using the recovered ammonia as a reducing agent for the denitration. A method for removing $CO_2$ from a combustion exhaust gas comprising the step of bringing the combustion exhaust gas into contact under atmospheric pressure with an aqueous monoethanolamine solution having a concentration of 35% by weight or more.

9 Claims, 7 Drawing Sheets

METHOD FOR TREATING COMBUSTION EXHAUST GAS

BACKGROUND OF THE INVENTION

1. Field of the Invention

The present invention relates to a method for treating a combustion exhaust gas. More specifically, it relates to a method for recovering carbon dioxide ($CO_2$) present in a combustion exhaust gas, while removing small amounts of ammonia present in the remaining exhaust gas after the recovery of $CO_2$ by the use of an aqueous alkanolamine solution, and also a method for treating a combustion exhaust gas which has a denitration step for removing $NO_x$ (nitrogen oxides) present in the combustion exhaust gas and a $CO_2$ removal step of removing $CO_2$ using an aqueous alkanolamine solution in which ammonia ($NH_3$) present in the combustion exhaust gas after the $CO_2$ removal treatment is recovered and then used as a reducing agent in the denitration step, and further a method for removing $CO_2$ from a combustion exhaust gas using an aqueous monoethanolamine (MEA) solution having a specific concentration as an absorbing agent.

2. Description of the Related Art

In recent years, a greenhouse effect by $CO_2$ is indicated as one cause of the warming of the earth, and its prompt resolution is globally required in order to protect earth environment. Sources of $CO_2$ extend over almost all fields of human activities in which fossil fuels are burned, and there is a tendency that regulations on the discharge of $CO_2$ will be further tightened in the future. Thus, for power generation facilities such as thermoelectric power plants in which a large amount of the fossil fuel is used, intensive research efforts are being made on methods for recovering $CO_2$ in a combustion exhaust gas by bringing the combustion exhaust gas coming from a boiler into contact with an aqueous alkanolamine solution or the like, and on methods for storing the recovered $CO_2$ without discharging it into the atmosphere.

FIG. 7 shows one example of a process for recovering $CO_2$ present in a combustion exhaust gas by the use of an aqueous alkanolamine solution. In FIG. 7, only major devices and parts are shown, and auxiliary devices are omitted.

Examples of alkanolamines which can be used to recover $CO_2$ include aqueous solutions of monoethanolamine, diethanolamine, triethanolamine, methyldiethanolamine, diisopropanolamine and diglycolamine, and aqueous mixed solutions thereof. In general, an aqueous solution of monoethanolamine is preferred.

In FIG. 7, a combustion exhaust gas which comes from a boiler or the like and which is to be discharged through a chimney has normally a temperature of 100° to 150° C., and this gas is introduced into a combustion exhaust gas cooling column 1 through line 5 and then brought into contact with a cooling water circulated through line 12 by a pump 11. The cooling water is cooled by a heat exchanger 13 and used repeatedly. Usually, the combustion exhaust gas cooled to a temperature in the range of about 40° to 80° C. is introduced into a $CO_2$ absorbing column 2 through line 6.

An aqueous solution of an alkanolamine, e.g., monoethanolamine, at a concentration of 20 to 30% by weight is conducted to the $CO_2$ absorbing column 2 through line 9. The aqueous monoethanolamine solution is brought into counter current contact with the combustion exhaust gas, and the aqueous monoethanolamine solution having absorbed $CO_2$ is then fed from a lower portion of the column to a regeneration column 3 through line 7 for its regeneration. In order to prevent monoethanolamine from being discharged together with the remaining combustion exhaust gas (hereinafter referred to also as "the treated exhaust gas" at times) from which $CO_2$ has been absorbed, a water washing and cooling section for the treated exhaust gas is provided in the upper portion of the $CO_2$ absorbing column 2, and this section is equipped with a pump 15, a heat exchanger 16 and a tray 18 to which water is fed through line 19. The treated exhaust gas which has been washed and cooled with water in these devices is discharged to the atmosphere through line 8.

In the aqueous monoethanolamine solution regeneration column 3, the aqueous monoethanolamine solution is regenerated by heating the same with steam fed through a reboiler 4, and it is then returned to the absorbing column 2 through line 9. $CO_2$ and water vapor are led together to a recovery step through line 10.

In addition, a cooling system for the combustion exhaust gas illustrated in FIG. 7 is mainly used for a fuel, such as LNG, containing a large amount of hydrogen. According to this cooling system, steam derived from the fuel and present in the combustion exhaust gas is cooled and becomes condensed water. This condensed water is accumulated as the cooling water circulating through line 12. Therefore, an excess of the cooling water is constantly discharged from the system through line 14 using a water level meter and the like (not shown) located in the lower portion of the combustion exhaust gas cooling column 1.

As a cooling system for the combustion exhaust gas, there is another system utilizing a humidification cooling technique suitable for boilers which use fuel containing a large amount of carbon, such as coal or fuel oil. In this system, no heat exchanger 13 is usually disposed, and circulating water is simply brought into contact with a combustion exhaust gas to cause the water evaporate for the purpose of cooling. Since the circulating water is gradually lost, it is necessary to replenish water from the outside.

In the above-mentioned process, ammonia is detected in the treated exhaust gas discharged through line 8, though its amount is very small. It is presumed that this ammonia in the treated exhaust gas is attributable to the decomposition of part of alkanolamine during the treatment processes. Another origin of the detected ammonia is considered to be residue of ammonia which has been added to the fuel for the purpose of decreasing the amount of $NO_x$ in the combustion exhaust gas. In any case, if ammonia, though its amount is very small, is discharged into the atmosphere together with the treated exhaust gas without any additional treatment, another environmental problem of bad odor may occur. Therefore, this ammonia has to be removed. However, ammonia is present in the treated exhaust gas in very small amounts, and thus how ammonia can effectively be removed has been a problem yet to be solved.

Further, when burned, fossil fuel generates pollutants, such as $NO_x$ (nitrogen oxides) and $SO_x$ (sulfur oxides), though the degree of this pollutant generation depends upon the kind of the fossil fuel. These pollutants cause air pollution and acid rain, and regulations on their discharge will be further tightened. With this current trend, measures have been taken so that a combustion exhaust gas coming from a boiler is treated by denitration and desulfurization processes. Among these measures, a method is known in which denitration is carried out using $NH_3$ (ammonia) as a reducing agent under the presence of a catalyst to decompose $NO_x$ into nitrogen and water. The concentration of $NH_3$ used is usually in the range of 50 to 150 ppm, depending upon the amount of $NO_x$ in the combustion exhaust gas.

As described above, $NH_3$ is used as a reducing agent for $NO_x$ in the denitration of a combustion exhaust gas. Therefore, in a denitrating apparatus for the combustion exhaust gas, a storage tank for liquid $NH_3$ is usually disposed. In order to store liquid $NH_3$, however, a low temperature and a high pressure must be maintained, and $NH_3$ itself is poisonous. In addition, $NH_3$ is combustible, and when mixed with air produces an explosive mixed gas. Thus, $NH_3$ is controlled under various laws and regulations in Japan, such as laws related to fire regulations, handling of high pressure gases, and control of noxious odor. Therefore, in the denitration step in which $NO_x$ is removed from the combustion gas, special storage and feed facilities for $NH_3$, which is difficult to handle, are required.

On the other hand, in the above-mentioned $CO_2$ removal step, ammonia ($NH_3$) is detected, even though its amount is small, in the combustion exhaust gas which has been subjected to a $CO_2$ removal treatment. It may be presumed that the $NH_3$ is generated by the decomposition of part of alkanolamine in the process system. If $NH_3$, though present in small amounts, is discharged into the atmosphere together with the $CO_2$-free exhaust gas without any additional treatment, another environmental problem may occur. Therefore, $NH_3$ has to be recovered and disposed without any environmental harm.

As mentioned above, the concentration of an aqueous solution of monoethanolamine (MEA), which is a kind of alkanolamine, for absorbing $CO_2$ is normally up to about 30% by weight, and it has not been used to remove $CO_2$ from a combustion exhaust gas under atmospheric pressure at any concentrations higher than 35% by weight. The reason for this may be the fact that known techniques for removing $CO_2$ from the combustion exhaust gas by the aqueous MEA solution under atmospheric pressure are limited, and that when the aqueous MEA solution at a high concentration is used, it is feared that a perceptible amount of the valuable MEA is discharged and lost from a $CO_2$ removing column together with the combustion exhaust gas from which $CO_2$ has been removed. Furthermore, even if the aqueous MEA solution is used at a high concentration, it has been considered that energy saving is scarcely expected at such concentrations as 20 to 30% by weight.

In a process for removing $CO_2$ from a combustion exhaust gas by an aqueous MEA solution, it is desirable to decrease energy used in the process as much as possible. In particular, the aqueous MEA solution is circulated and repeatedly used in the system, and therefore it is beneficial to decrease the volume of the aqueous MEA solution for the purpose of reducing an electric power consumption of a pump or the like. Moreover, in order to regenerate a reusable aqueous MEA solution from the aqueous MEA solution having absorbed $CO_2$, a large amount of heat energy is necessary, and therefore it is important from an economical viewpoint to reduce the consumption of heat energy.

SUMMARY OF THE INVENTION

The present inventors have made an intensive investigation on possible ways to remove ammonia produced in a recovery process shown in FIG. 7 in which $CO_2$ in a combustion exhaust gas is absorbed and recovered using an alkanolamine. They have found that it is effective to use water occurring the recovery process and containing a small amount of $CO_2$ as an ammonia absorbing liquid. A first aspect of the present invention has been made based on such findings.

That is, the first aspect of the present invention provides a method for recovering $CO_2$ by absorbing $CO_2$ present in a combustion exhaust gas using an aqueous solution of an alkanolamine, in which the combustion exhaust gas from which $CO_2$ has been absorbed is brought into contact with water containing $CO_2$.

The water which has underwent the contact with the exhaust gas may be discharged out of the system.

Furthermore, in a preferable embodiment, condensed cooling water for the combustion exhaust gas or water which has been brought into contact with the combustion exhaust gas is fed to the top of a $CO_2$ absorbing column as said water containing $CO_2$ so as to bring the water into contact with the treated exhaust gas after the $CO_2$ absorption.

According to the first aspect of the present invention, ammonia present, though in small amounts, in the combustion exhaust gas from which $CO_2$ has been removed by an aqueous alkanolamine solution can be effectively removed in the form of stable ammonium salts.

Also, the present inventors have made an intensive investigation on the above-mentioned problem of handling $NH_3$ associated with the conventional denitration processes for combustion exhaust gas and the above-mentioned problem of recovering and disposing $NH_3$ formed during $CO_2$ removal, which has recently attracted much attention. As a result, they have found that these problems can be simultaneously resolved by recovering $NH_3$ present in the combustion exhaust gas subjected to a $CO_2$ removal treatment and then using the same in the denitration step, and completed a second aspect of the present invention.

That is, the second aspect of the present invention is directed to a method for treating a combustion exhaust gas which has a denitration step for denitrating the combustion exhaust gas using $NH_3$ as a reducing agent and a $CO_2$ removal step for removing $CO_2$ present in the combustion exhaust gas by bringing the combustion exhaust gas into contact with an aqueous alkanolamine solution, in which ammonia present in the combustion exhaust gas having been subjected to the $CO_2$ removal treatment by the contact with the aqueous alkanolamine solution is recovered and then used as the reducing agent in the denitration step.

According to the second aspect of the present invention, $NH_3$ present in a combustion exhaust gas which has been subjected to a $CO_2$ removal treatment can be recovered and then used as a reducing agent in the denitration step, so that a storage installation for liquid $NH_3$ becomes unnecessary in the denitration process. Furthermore, most of $NH_3$ present in the combustion exhaust gas after being subjected to the $CO_2$ removal treatment and being discharged from the $CO_2$ removal step can be recovered, whereby an environmental problem associated with $NH_3$ which secondarily occurs in small amounts can be solved.

The present inventors have intensively investigated into the possibility of reducing energy consumed during the process of removing $CO_2$ from a combustion exhaust gas by the use of an aqueous MEA solution, and as a result, they have found that the employment of the aqueous MEA solution having a certain concentration is effective and completed a third aspect of the present invention.

That is, the third aspect of the present invention is directed to a method for removing $CO_2$ present in a combustion exhaust gas by bringing the combustion exhaust gas into contact with an aqueous MEA solution under atmospheric pressure, in which an aqueous MEA solution having a concentration of 35% by weight or more is used.

According to the third aspect of the present invention, in a process for absorbing $CO_2$ in a combustion exhaust gas, an aqueous MEA solution having a certain concentration is used in accordance with the present invention, whereby the amount of the circulating aqueous MEA solution can be decreased. In addition, in the regeneration of the aqueous MEA solution, the amount of a required steam (heat energy) can also be decreased.

DETAILED DESCRIPTION OF THE PREFERRED EMBODIMENT

The first to third aspects of the present invention will now be described in detail with reference to the attached drawings.

Figure 1:
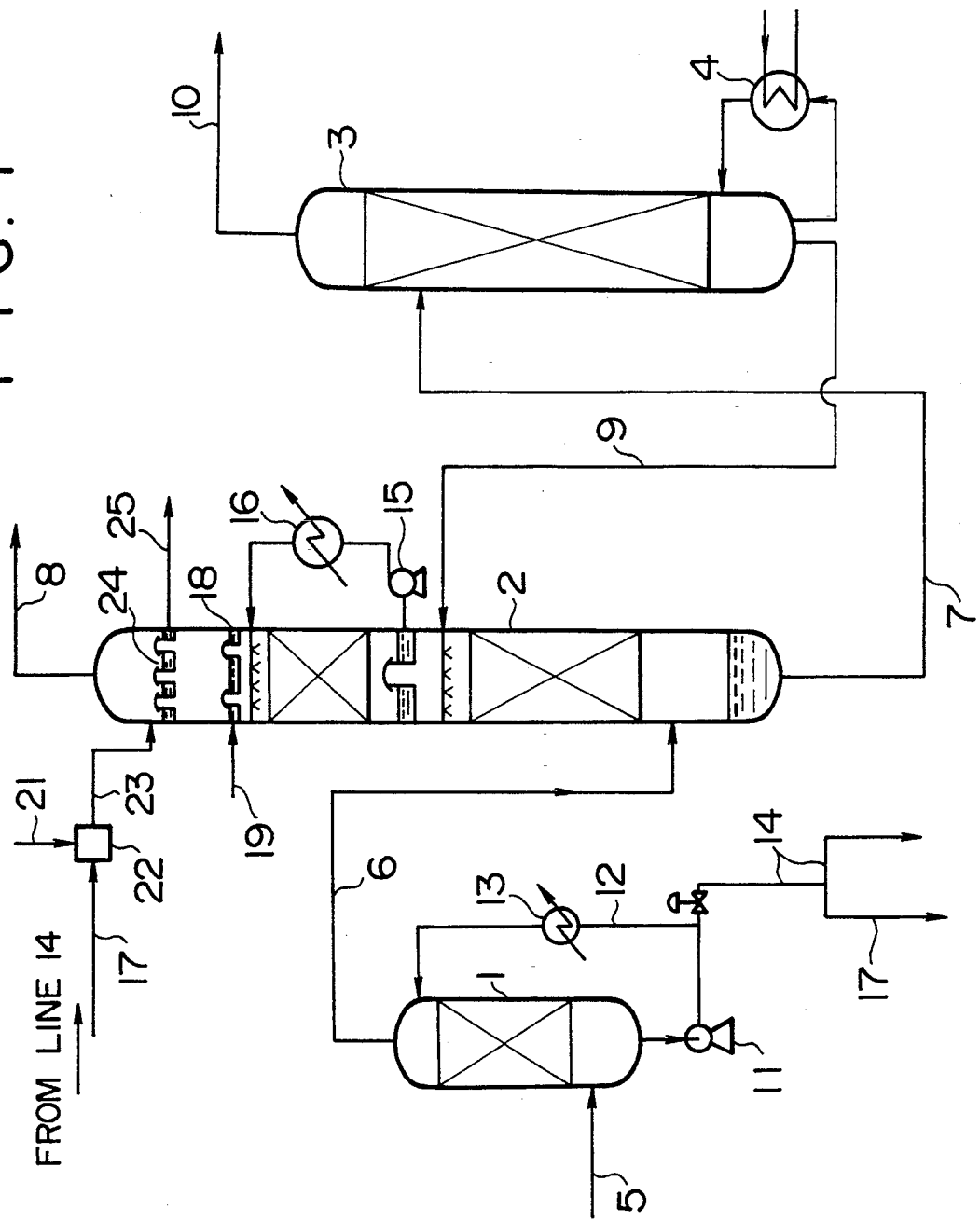
FIG. 1 is an illustrative diagram of one embodiment of a process which can be employed in a $CO_2$ recovery method of the first aspect of the present invention.
Figure 7:
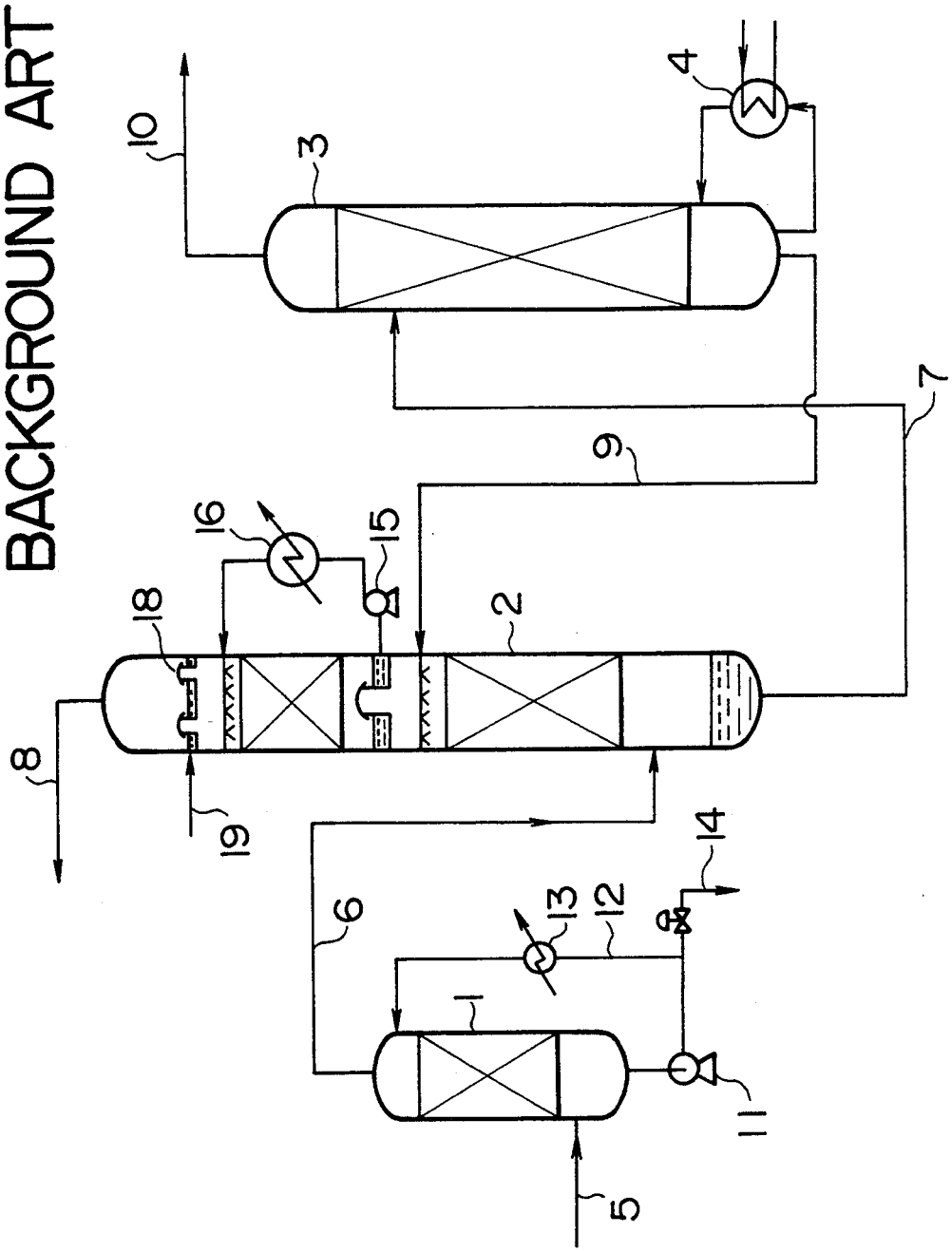
FIG. 7 is an illustrative diagram of one embodiment of a process which can be employed in a conventional $CO_2$ recovery method.

As one embodiment of the method according to the first aspect of the present invention, a process is shown in FIG. 1. In FIG. 1, only major devices and parts are shown, and relatively minor fittings are omitted. The like symbols in FIG. 7 denote the like members as in FIG. 1.

In the method for recovering $CO_2$ of the first aspect of the present invention, the treated exhaust gas after $CO_2$ absorption is brought into contact with water containing $CO_2$. In this case, this water containing $CO_2$ preferably contains 20 ppm or more, preferably 25 ppm or more of $CO_2$. When ammonia in the treated exhaust gas is brought into contact with the water containing $CO_2$, either of reactions represented by the following formulae takes place, and ammonia is absorbed by the water to form ammonium carbonates:

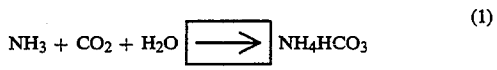
(1)

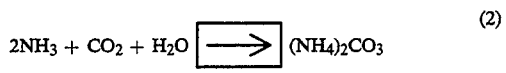
(2)

The ammonium carbonates formed in these reactions are stable in an aqueous solution. Since ammonia can be removed in the form of these ammonium carbonates, discharge of ammonia into the atmosphere may be prevented.

The short-term contact of the treated exhaust gas with water containing $CO_2$, particularly one containing 20 ppm or more of $CO_2$, permits the effective removal of ammonia from the treated exhaust gas (exhaust gas after the absorption of $CO_2$) as stable ammonium salts.

The water containing $CO_2$, one containing 20 ppm or more of $CO_2$ in particular, may be cooling water which has been brought into contact with combustion exhaust gas so as to cool the high-temperature combustion exhaust gas or, more specifically, cooling water circulated by means of the pump 11. In particular, it may also be part or all of condensed cooling water which is to be discharged from the system as excess water through line 14. FIG. 1 shows an embodiment in which part of excess water coming through line 14 is introduced into the $CO_2$ absorbing column 2 through line 17.

In the above-mentioned humidification cooling method which is not shown, part of water (which has been brought into contact with the combustion exhaust gas) circulating for cooling by humidification can be drawn and used.

As described above, the above-mentioned water usually contains 20 ppm of $CO_2$, depending upon a kind of fuel to be used in the boiler, cooling conditions of the combustion exhaust gas, circulation and reuse conditions of the cooling water and the like. Therefore, such water can be directly used in the method of the present invention without any additional treatment. When the concentration of $CO_2$ is low, for example, at 20 ppm or less, owing to the above-mentioned conditions, part of recovered $CO_2$ can be used to easily increase the concentration of dissolved $CO_2$. For example, there can be provided in line 17 a contact device 22 in which water is brought into contact with $CO_2$ fed through line 21, so that the $CO_2$ concentration in water fed to the absorbing column 2 through line 23 can be adjusted to the preferable concentration range or more. Also when $CO_2$-containing water, particularly water containing $CO_2$ at a preferable concentration, is prepared from water containing almost no $CO_2$, the contact device 22 for contact with $CO_2$ can be used.

$CO_2$ fed through line 21 may be just $CO_2$, or $CO_2$ gas mixed with steam or present in water. The amount of $CO_2$ for this purpose can be obtained by using a very small portion of $CO_2$ recovered in the aqueous monoethanolamine solution regeneration column 3.

The number of moles of $CO_2$ which is fed to the top of the $CO_2$ absorbing column 2 through line 23 per unit time should be determined considering the stoichiometry of the above-mentioned chemical formulae (1) and (2), and the conversion of ammonia into ammonium salts which depends upon contact conditions at the column top. However, the number of moles of $CO_2$ should preferably be equal to or more than that of ammonia which is discharged through line 8 per unit time.

The $CO_2$-containing water fed through line 23 is brought into contact with the treated exhaust gas at the top of the absorbing column 2 using an ordinary gas-liquid contact method which uses a tray 24 as in the embodiment of FIG. 1, so as to absorb ammonia present therein, and the water containing ammonia is then led to effluent treating facilities or the like installed outside the $CO_2$ absorbing and recovering system through line 25. Since ammonia is discharged from the system this way, ammonium salts are no longer accumulated in the system, and ammonia is prevented from recurring by the decomposition of the accumulated ammonium salts.

Now, the first aspect of the present invention will be described more specifically with reference to Experimental and Comparative Examples.

(EXPERIMENTAL EXAMPLE 1)

A process shown in FIG. 1 was employed to absorb $CO_2$ in combustion exhaust gas of natural gas. In this case, however, $CO_2$ was not fed through line 21. Under conditions that $CO_2$-containing water was not fed to the top of the $CO_2$ absorbing column 2 through line 17, the discharge volume of the treated exhaust gas was 555 $Nm^3/hr$, and the concentration of ammonia was 39.3 ppm, which corresponded to an ammonia discharge volume of $9.74 \times 10^{-4}$ kg mole/hr.

Next, while $CO_2$ was absorbed under the above-mentioned conditions, excess water (50° C.; atmospheric pressure; $CO_2$ concentration of 28 ppm) coming from a combustion exhaust gas cooling column 1 was fed through line 17 at a ratio of 30 kg/hr. At this time, an ammonia concentration in the treated exhaust gas discharged through line 8 was 25 ppm.

(COMPARATIVE EXAMPLE 1)

The same procedure as in the above-mentioned Experimental Example 1 was repeated except that water containing no $CO_2$ was fed through line 17. In this case, the ammonia concentration in the treated exhaust gas discharged through line 8 was 37 ppm. This represents only a small decrease in the amount of ammonia present in the treated exhaust gas.

Next, the second aspect of the present invention will be described in detail with reference to FIGS. 2 and 3.

Figure 2:
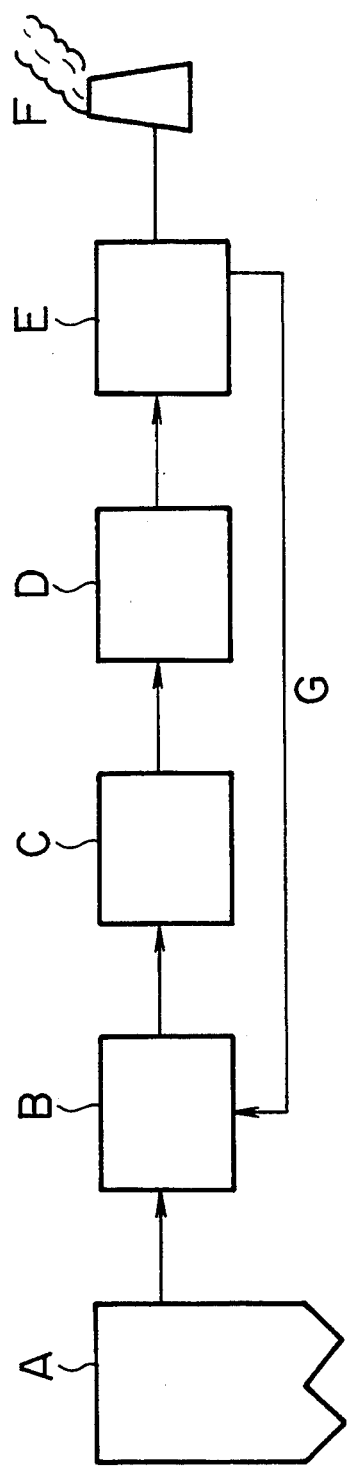
FIG. 2 shows one example of a treatment process of a combustion exhaust gas to which the second aspect of the present invention can be applied.

FIG. 2 shows one example of a treatment process for a combustion exhaust gas to which the present invention is applied. In FIG. 2, A indicates a boiler in which coal, naphtha or fuel oil is used as a fuel, B a denitration step, C a dust collection step containing an electrostatic precipitator, D a desulfurization step, E a $CO_2$ removal step, F a chimney, and G a transport line for recovered $NH_3$.

The temperature of the combustion exhaust gas led to the denitration step is usually from 200° to 400° C., depending upon kinds of selected fuel and boiler. Examples of the $NO_x$ present in the combustion exhaust gas include NO, $NO_2$ and $N_2O$, but the major component of the $NO_x$ is NO. The concentration of NO in the combustion exhaust gas depends upon the kind of fuel and conditions for combustion. The NO concentration is usually from 50 to 100 ppm when LNG is burned, from 100 to 150 ppm if fuel oil is burned, and from 200 to 500 ppm if coal is burned. The ratio of NO which can be removed in the denitration step is usually from about 50 to 80%. An example of a catalyst which can be used in the denitration step is a catalyst in which titanium oxide is used as a carrier and an oxide of a transition metal, such as vanadium pentaoxide, is used as an active component. The supply of ammonia ($NH_3$) which serves as a reducing agent depends upon a desired degree of denitration, but $NH_3$ may be injected to the denitration step so that the concentration of $NH_3$ becomes about 50 to 80% of the $NO_x$ concentration. An optimum temperature for starting the injection of $NH_3$ depends upon the kind of fuel, but if LNG is used, the optimum temperature would be between 200° and 400° C. In the present invention, $NH_3$ normally required in the denitration step can be supplemented with $NH_3$ recovered in the $CO_2$ removal step, depending upon operating conditions at the $CO_2$ removal step.

Usually, during the treatment of the combustion exhaust gas to which the present invention is applied, the combustion exhaust gas is first subjected to desulfurization in a desulfurization step, and the thus treated combustion exhaust gas is then brought into contact with an aqueous alkanolamine solution for $CO_2$ removal at the $CO_2$ removal step, as shown in FIG. 2. For this desulfurization, various dry methods and wet methods have been heretofore suggested, but a typical technique is the so-called wet lime-gypsum method in which $SO_x$ is absorbed by an aqueous slurry of limestone (calcium carbonate) powder, and then recovered in the form of gypsum.

Examples of the aqueous alkanolamine solution which can be used to absorb $CO_2$ in the $CO_2$ removal step include aqueous solutions of monoethanolamine, diethanolamine, triethanolamine, methyldiethanolamine, diisopropanolamine and diglycolamine, and aqueous mixtures thereof. Usually, the aqueous monoethanolamine (MEA) solution is preferably used.

No particular restriction is placed on a process with which $CO_2$ present in the combustion exhaust gas is removed therefrom using an aqueous alkanolamine solution, above all, an aqueous MEA solution, but one preferable example of the process will be described in reference to FIG. 3. In FIG. 3, only major devices and parts are shown, and less important parts are omitted for ease of understanding.

Figure 3:
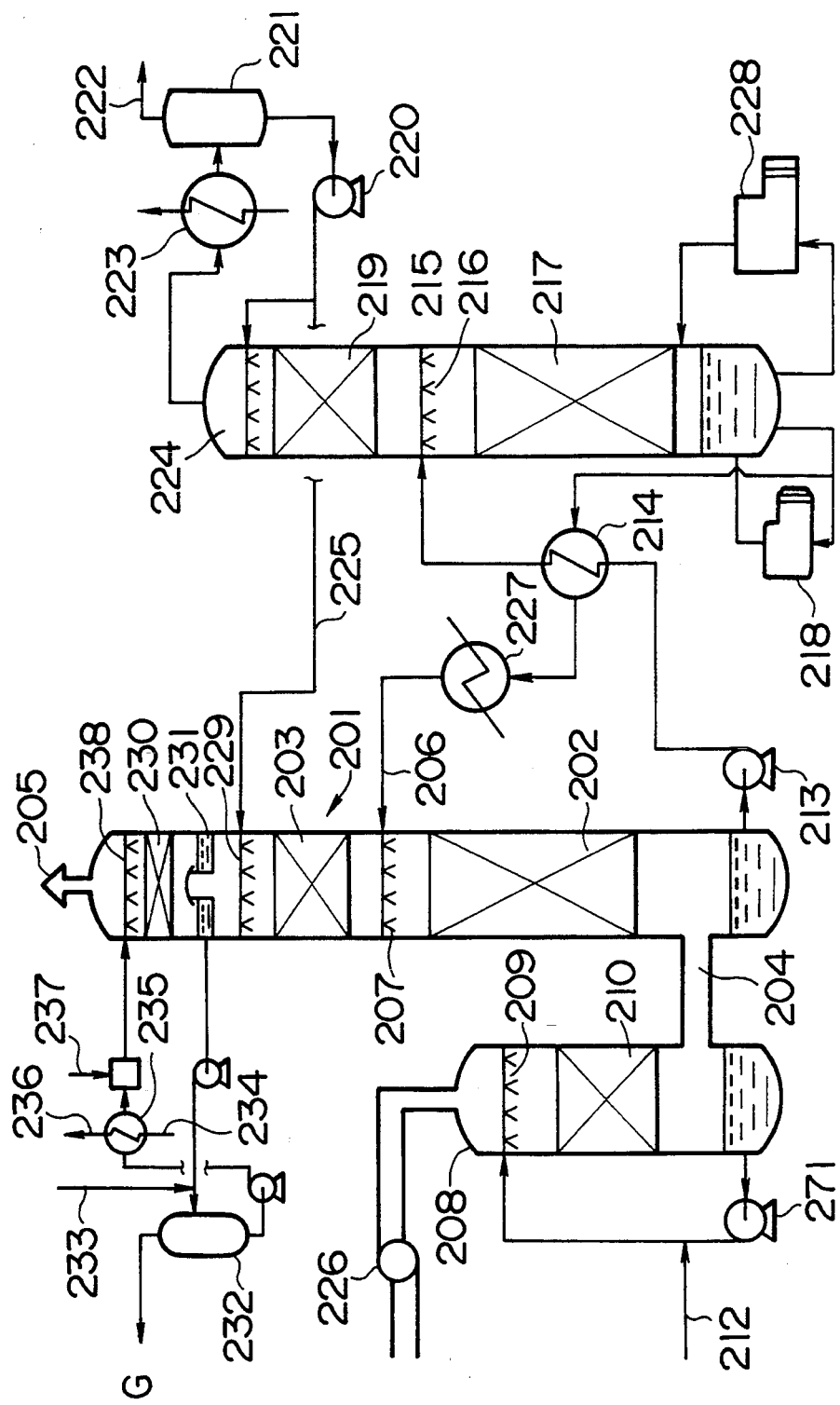
FIG. 3 shows one example of a $CO_2$ removal process to which the second aspect of the present invention can be applied.

In FIG. 3, reference numeral 201 indicates a $CO_2$ removing column, 202 a lower filled portion, 203 an upper filled portion or a tray, 204 a combustion exhaust gas feed inlet of the $CO_2$ removing column, 205 a discharge outlet for the $CO_2$-free combustion exhaust gas, 206 an aqueous MEA solution feed inlet, 207 a first nozzle, 208 a cooler for the combustion exhaust gas disposed as needed, 209 a nozzle, 210 a filled portion, 211 a humidifying and cooling water circulating pump, 212 a feed line for supplemental water, 213 a discharge pump for an aqueous MEA solution for absorbing $CO_2$, 214 a heat exchanger, 215 an aqueous MEA solution regeneration column (hereinafter referred to as "a regeneration column" at times), 216 a first nozzle, 217 a lower filled portion, 228 a regeneration heater (reboiler), 219 an upper filled portion, 220 a reflux water pump, 221 a $CO_2$ separator, 222 a discharge line for recovered $CO_2$, 223 a reflux cooler for the regeneration column, 224 a second nozzle, 225 a feed line of reflux water from the regeneration column, 226 a combustion exhaust gas feed blower, 227 a cooler, and 228 a reclaimer (accumulated-heat stable-salt removing device).

Moreover, reference numeral 229 indicates a second nozzle of the $CO_2$ removing column 201, 230 a filled portion for $NH_3$ removal, 231 a tray, 238 a third nozzle, 232 an $NH_3$ separating drum, 233 a steam feed line, 234 a cooling water feed line, 235 a cooler, 236 a $CO_2$ feed line, 237 a $CO_2$ mixer, and G the $NH_3$ transport line shown also in FIG. 2.

In FIG. 3, the combustion exhaust gas which has passed through the desulfurization step is introduced into the cooler 208 by means of the combustion exhaust gas feed blower 226 and then brought into contact with humidifying and cooling water from the nozzle 209 in the filled portion 201 to become humidified and cooled. The cooled combustion exhaust gas is introduced into the $CO_2$ removing column 201 through the combustion exhaust gas feed inlet 204 of the $CO_2$ removing column. The humidifying and cooling water which has been brought into the combustion exhaust gas is stored in the lower portion of the combustion exhaust gas cooler 208 and circulated through the nozzle 209 by means of the pump 211. The humidifying and cooling water is gradually lost as it humidifies and cools the combustion exhaust gas, and thus replenished through the feed line 212 for water supply.

The combustion exhaust gas introduced into the $CO_2$ removing column 201 is brought into contact with the aqueous MEA solution of a given concentration fed through the first nozzle 207 in a counter current manner in the lower filled portion 202, whereby $CO_2$ in the combustion exhaust gas is absorbed and removed therefrom by the aqueous MEA solution. The combustion exhaust gas after the $CO_2$ removal treatment streams toward the upper filled portion 203. The aqueous MEA solution fed to the $CO_2$ removing column 201 absorbs $CO_2$, and the temperature of the aqueous MEA solution becomes higher than its temperature at the feed inlet 206 owing to reaction heat generated by the absorption. Then, the aqueous MEA solution is conducted to the heat exchanger 214 by means of the discharge pump 213 for the aqueous MEA solution, heated therein, and then led to the regeneration column 215 through the first nozzle 216.

In the regeneration column 215, the aqueous MEA solution is regenerated in its lower filled portion 217 by the heat from the regeneration heater 218, and the thus regenerated aqueous MEA solution is cooled by the heat exchanger 214 and then returned to the $CO_2$ removing column 201. If necessary, the solution is further conducted through the cooler 227 disposed between the heat exchanger 214 and the aqueous MEA solution feed inlet 206 before returned to the $CO_2$ removing column 201.

In the upper portion of the regeneration column 215, $CO_2$ separated from the aqueous MEA solution is brought into contact with reflux water fed through the second nozzle 224 and then cooled by the regeneration column reflux cooler 223. Subsequently, in the $CO_2$ separator 221, $CO_2$ is separated from the reflux water formed by the condensation of water vapor delivered with $CO_2$ and then led to a $CO_2$ recovery step through the discharge line 222 for recovered $CO_2$. As the operation of the $CO_2$ recovery step continues, part of MEA forms stable salts and accumulates in the system. In order to prevent this accumulation, the reclaimer 228 in FIG. 2 is periodically operated to treat, for example, a liquid present at the bottom of the regeneration column 215.

In the $CO_2$ removal process shown in FIG. 3, the combustion exhaust gas having been subjected to the $CO_2$ removal treatment by the contact with the aqueous alkanolamine (MEA) solution contains $NH_3$, as describe above. The content of $NH_3$ is not constant but depends upon the operating conditions of the $CO_2$ removal step. However, it is usually from 30 to 80 ppm. In the present invention, $NH_3$ present in the combustion exhaust gas subjected to the $CO_2$ removal treatment is recovered, and then conducted to a denitration step through the $NH_3$ transport line in FIG. 2.

As a process for recovering $NH_3$ from the combustion exhaust gas which has been subjected to the $CO_2$ removal treatment, it is preferred to bring the combustion exhaust gas into contact with water containing $CO_2$ in the $CO_2$ removing column 201. The $CO_2$ containing water may be obtained, for example, by circulating the water for $NH_3$ absorption through the third nozzle 238, the filled portion 230 for $NH_3$ removal, the tray 231, the $NH_3$ separating drum 232 and the third nozzle 238 to mix the water with $CO_2$ fed through the $CO_2$ feed line 236 in the $CO_2$ mixer 237, as shown in the top of the $CO_2$ removing column 201 in FIG. 2. Other examples of the water containing $CO_2$ include a regeneration column reflux water fed through the second nozzle 229 of the $CO_2$ removing column 201 and a humidifying and cooling water of the cooler 208 for the combustion exhaust gas. It is possible to make any of these waters contain $CO_2$ in a saturated state or at near-saturation concentrations at a given temperature. For example, when the temperature is about 40° C., water can contain $CO_2$ at a concentration of about 400 ppm.

The combustion exhaust gas from which $CO_2$ has been removed in the lower filled portion 202 of the $CO_2$ removing column 201 usually has a temperature of 50° to 80° C. and contains a relatively large amount of an MEA vapor corresponding to a vapor partial pressure at this temperature, a trace amount of $NH_3$ and water vapor. This combustion exhaust gas streams upward and comes into contact with the above-mentioned reflux water fed from the regeneration column 215 through the regeneration column reflux water feed line 225. Since MEA and $NH_3$ are weak bases, they are easily absorbed by the regeneration column reflux water when the regeneration column reflux water containing weakly acidic $CO_2$ in a substantially saturated state comes into contact with the combustion exhaust gas after the $CO_2$ removal treatment in the upper contact portion 203. However, $NH_3$ is considered to be a decomposition and deterioration product of MEA, and after $NH_3$ has been accumulated in the system and saturated, $NH_3$ is discharged in the form of a vapor to the upper portion of the upper filled portion 203. In the preferable embodiment of the present invention, this $NH_3$ vapor is absorbed by the water containing $CO_2$ in the top of the $CO_2$ removing column, taken out from the system, delivered to the denitration step B shown in FIG. 2, and then utilized, as described above.

$NH_3$ in the combustion exhaust gas subjected to the $CO_2$ removal treatment is reacted with $CO_2$ in the above-mentioned water containing $CO_2$. As a result, either of the reactions represented by the following formulas takes place, and ammonia is absorbed by the water to form ammonium carbonates:

(3)
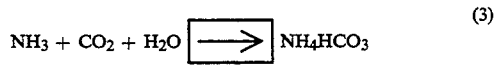
$NH_3 + CO_2 + H_2O \longrightarrow NH_4HCO_3$ (4)
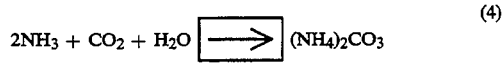
$2NH_3 + CO_2 + H_2O \longrightarrow (NH_4)_2CO_3$ Any of the ammonium carbonates formed according to the above-mentioned reaction formulas decomposes into $NH_3$, water and $CO_2$ at 70° C. or higher, and therefore, in the process shown as an example in FIG. 3, steam at a temperature of 100° C. or higher can be blown through the steam feed line 233 into the water containing $NH_3$ taken out from the $CO_2$ removing column 201 to easily regenerate $NH_3$. Together with similarly regenerated gaseous $CO_2$, the thus regenerated $NH_3$ is separated from the water in the $NH_3$ separating drum 232, and then delivered to the denitration step B shown in FIG. 2 through the $NH_3$ transport line G. The water from which the regenerated $NH_3$ has been removed is cooled in the cooler 235. Subsequently, in the $CO_2$ mixer 237, this water again dissolves $CO_2$ fed through the $CO_2$ feed line 236, and it is conducted to the third nozzle 238 located at the top of the $CO_2$ removing column 201.

According to the second aspect of the present invention, a storage installation for $NH_3$, which is troublesome to handle, becomes unnecessary in the denitration process, and also $NH_3$ is effectively prevented from being discharged from the system through the discharge outlet 205 for the combustion exhaust gas after the $CO_2$ removal treatment. The $NH_3$ recovered in the $CO_2$ removal process can be effectively utilized as the reducing agent in the denitration process.

The effectiveness of the method according to the second aspect of the present invention will be shown in detail with reference to Experimental Example 2.

(EXPERIMENTAL EXAMPLE 2)

A combustion exhaust gas was treated using the steps and equipment shown in FIGS. 2 and 3. In the denitration step B, $TiO_2$ was used as a denitrating catalyst and a denitration temperature was set to 300° C. In this case, $NH_3$ used as a reducing agent was all prepared by the absorption and recovery of $NH_3$ using regeneration column reflux water coming from the $CO_2$ removal step, and then by the regeneration with steam of 1 $kg/cm^2G$. Various conditions are shown in Table 1.

TABLE 1

| Item | Units | |
|---|---|---|
| Amount of combustion exhaust gas discharged from boiler A | $Nm^3/H$ | 2213 |
| Pressure of combustion exhaust gas | | Atmos. pressure |
| Temp. of combustion exhaust gas | °C. | 100 |
| $CO_2$ conc. in combustion exhaust gas | mole % | 8.6 |
| $NO_x$ conc. in combustion exhaust gas | ppm | 50 |
| Water conc. in combustion exhaust gas | mole % | 17.3 |
| $NO_x$ conc. in combustion exhaust gas at outlet of denitration step B | ppm | 10 |
| Denitration ratio | % | 80 |
| Temp. of denitration step | | 300 |
| Amount of combustion exhaust gas at inlet of $CO_2$ removing column | $Nm^3/H$ | 1752 |
| $CO_2$ conc. in combustion exhaust gas at inlet of $CO_2$ removing column | mole % | 8.3 |
| Water conc. in combustion exhaust gas at inlet of $CO_2$ removing column | mole % | 19.5 |
| Temp. of combustion exhaust gas at inlet of $CO_2$ removing column | °C. | 61 |
| Amount of aqueous MEA solution at aqueous MEA solution feed inlet | kg/H | 4367 |
| Temp. of aqueous MEA solution at aqueous MEA solution feed inlet | °C. | 38 |
| Temp. of aqueous MEA solution for absorbing $CO_2$ | °C. | 64 |
| $CO_2$ absorption ratio | % | 90 |
| Amount of combustion exhaust gas after $CO_2$ treatment in $CO_2$ removing column | °C. | 61 |
| $NH_3$ conc. in combustion exhaust gas after $CO_2$ treatment in $CO_2$ removing column | ppm | 40 |
| MEA vapor conc. in combustion exhaust gas after $CO_2$ removal treatment at outlet of $CO_2$ removing column | ppm | 0.1 |
| Feed amount of $NH_3$ to denitration step B through transport line G | kg · mole/H | $4.3 \times 10^{-3}$ |
| Temp. of water fed through third nozzle | °C. | 50 |
| Amount of water fed through third nozzle | kg/H | 450 |
| $CO_2$ conc. in water fed through third nozzle | ppm | 400 |

Next, the third aspect of the present invention will be described in detail.

Figure 4:
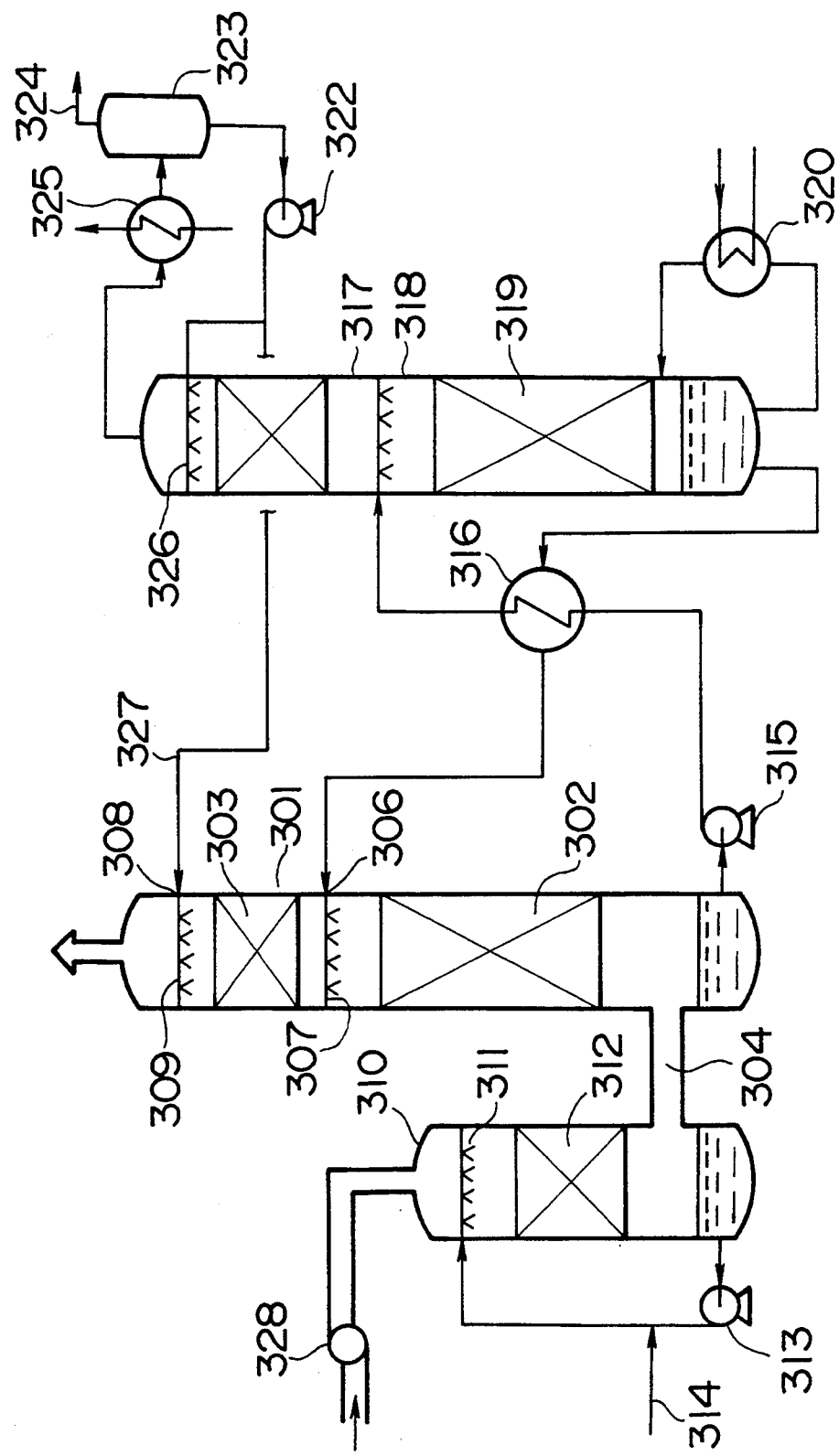
FIG. 4 is an illustrative view of one embodiment of a process employed in a method for removing $CO_2$ of the third aspect of the present invention.

One example of a process which can be employed in a method for removing $CO_2$ from a combustion exhaust gas according to the third aspect of the present invention will be described with reference to FIG. 4. In FIG. 4, only major parts are shown, and less important fittings are omitted.

In FIG. 4, reference numeral 301 indicates a $CO_2$ removing column, 302 a lower filled portion, 303 an upper filled portion or a tray, 304 a combustion exhaust gas feed inlet of the $CO_2$ removing column, 305 a combustion exhaust gas discharge outlet of the $CO_2$ removing column, 306 an aqueous MEA solution feed inlet, 307 a nozzle, 308 a reflux liquid feed inlet, 309 a nozzle, 310 a cooler for the combustion exhaust gas, 311 a nozzle, 312 a filled portion, 313 a humidifying and cooling water circulating pump, 314 a supplemental water feed line, 315 a discharge pump for the aqueous MEA solution for absorbing $CO_2$, 316 a heat exchanger, 317 an aqueous MEA solution regenerating column (hereinafter also called "a regenerating column"), 318 a nozzle, 319 a lower filled portion, 320 a regenerating heater (a reboiler), 321 an upper filled portion, 322 a reflux water pump, 323 a $CO_2$ separator, 324 a discharge line for recovered $CO_2$, 325 a reflux cooler of the regenerating column, 326 a nozzle, 327 a regenerating column reflux water feed line, and 328 a combustion exhaust gas feed blower.

The combustion exhaust gas is introduced into the cooler 310 for the combustion exhaust gas usually at 100° to 150° C. by means of the combustion exhaust gas feed blower 328 and then brought into contact with humidifying and cooling water from the nozzle 311 in the filled portion 312 to be humidified and cooled. The cooled combustion exhaust gas is then introduced into the $CO_2$ removing column 301 through the combustion exhaust gas feed inlet 304 of the $CO_2$ removing column. At this time, the temperature of the combustion exhaust gas at the inlet of the $CO_2$ removing column 301 is usually from 50° to 80° C., depending upon the kind of fuel and cooling conditions. The humidifying and cooling water which has been brought into contact with the combustion exhaust gas is stored in the lower portion of the cooler 310 for the combustion exhaust gas and then circulated through the nozzle 311 by means of the pump 313. The humidifying and cooling water is gradually lost as it humidifies and cools the combustion exhaust gas, and thus water is replenished through the supplemental water feed line 314.

The combustion exhaust gas introduced into the $CO_2$ removing column 301 is brought into contact with the aqueous MEA solution having a certain concentration and fed through the nozzle 307 in a counter current manner in the lower filled portion 302, whereby $CO_2$ in the combustion exhaust gas is absorbed and removed therefrom by the aqueous MEA solution. The combustion exhaust gas from which the $CO_2$ has been removed streams toward the upper filled portion 303. The aqueous MEA solution fed to the $CO_2$ removing column 301 absorbs $CO_2$, and consequently the temperature of the aqueous MEA solution becomes higher than its temperature at the feed inlet 306 owing to reaction heat generated by the absorption. Then, the aqueous MEA solution is delivered to the heat exchanger 316 by means of the discharge pump 315 for the aqueous MEA solution for absorbing $CO_2$, heated therein, and then led to the regenerating column 317.

The temperature of the aqueous MEA solution which is fed through the aqueous MEA solution feed inlet 306 is adjusted so that the temperature of the combustion exhaust gas may be at the same level at the inlet and at the outlet of the $CO_2$ removing column 301, whereby a water balance can be maintained in the $CO_2$ removing column 301 and further in the whole system shown in FIG. 4. Furthermore, even if the combustion exhaust gas discharged from the $CO_2$ removing column 301 has a high temperature, the escape of MEA from the system can be effectively prevented by feeding reflux water from the regenerating column 317 to the upper portion of the $CO_2$ removing column 301 through the reflux liquid feed inlet 308.

In the regenerating column 317, the aqueous MEA solution is regenerated by heat from the regenerating heater 320, and the thus regenerated aqueous MEA solution is cooled by the heat exchanger 316 and then returned to the aqueous MEA solution feed inlet 306 of the $CO_2$ removing column 301. In the upper portion of the regenerating column 317, $CO_2$ separated from the aqueous MEA solution is brought into contact with the reflux water fed through the nozzle 326 and then cooled by the regenerating column reflux cooler 325. Then, in the $CO_2$ separator 323, $CO_2$ is separated from the reflux water formed by the condensation of water vapor delivered with $CO_2$ and then led to a $CO_2$ recovery step through the discharge line 324 for recovered $CO_2$. The reflux water is returned to the regenerating column 317 by means of the reflux water pump 322.

In the process shown in FIG. 4, a part of this reflux water is fed to the $CO_2$ removing column 301 through the regenerating column reflux water feed line 327. The reflux water is water separated from $CO_2$ in the $CO_2$ separator 323, and therefore this water contains $CO_2$ at a concentration of saturation or near saturation at a given temperature. For example, when the temperature of the reflux water separated in the $CO_2$ separator 323 is about 40° C., the reflux water may contain $CO_2$ at a concentration of about 400 ppm. The combustion exhaust gas from which $CO_2$ has been removed in the lower filled portion 302 of the $CO_2$ removing column 301 usually has a high temperature of 50° to 80° C. and contains relatively large amounts of MEA vapor and water vapor corresponding to partial vapor pressures at this temperature. This combustion exhaust gas streams upward and is brought into contact with the above-mentioned reflux water fed from the regenerating column 317 through the regenerating column reflux water feed line 327. MEA is a weak base, and therefore, by bringing the reflux water containing weakly acidic $CO_2$ in a substantially saturated state with the $CO_2$-free combustion exhaust gas in the upper contact portion 303, MEA can be effectively prevented from being discharged into the atmosphere. After the reflux water which is fed to the $CO_2$ removing column 301 is brought into contact with the $CO_2$-free combustion exhaust gas to absorb MEA, this water falls through the $CO_2$ removing column 301, and it is mixed with the aqueous MEA solution and then returned to the regenerating column 317. The reflux water which is fed to the $CO_2$ removing column 301 is a part of the whole reflux water, and the reflux water fed thereto is subsequently returned to the regenerating column 317. Thus, there is no problem from the viewpoint of water balance in the system.

Incidentally, since the system is in a highly corrosive state owing to the presence of $CO_2$, oxygen, hydrogen and the like, it is preferred to add an inhibitor for corrosion prevention to the system, as necessary.

In the third aspect of the present invention, it is characterized that the aqueous MEA solution having a concentration of 35% by weight or more is used in the $CO_2$ removal process shown in FIG. 4 in which $CO_2$ is removed from the combustion exhaust gas under atmospheric pressure. The preferable concentration of the aqueous MEA solution depends upon a recovery ratio of $CO_2$ present in the combustion exhaust gas, but it is preferably 40% or more, more preferably in the range of 40 to 45%. Here, the above-mentioned "atmospheric pressure" is understood to also mean such a pressure as that applied by the pump in order to feed the combustion exhaust gas into the $CO_2$ removing column 301.

In order to maintain a predetermined value of the $CO_2$ absorption ratio which is defined as an absorption and removal ratio of $CO_2$ present in the combustion exhaust gas by the aqueous MEA solution, for example, an absorption ratio of 90% in the $CO_2$ removal column 301 under constant conditions of the combustion exhaust gas such as the temperature of the combustion exhaust gas, the $CO_2$ concentration in the combustion exhaust gas and the flow rate of the combustion exhaust gas, it is presumed that the amount of the required aqueous MEA solution decreases as the concentration of the aqueous MEA solution increases. However, the present inventors have found that decreases in the amount of the aqueous MEA solution do not follow a linear (1st order) function with respect to increases in the concentration, and that a liquid/gas ratio can be even further decreased as the concentration of the aqueous solution increases. The above-mentioned "liquid/gas ratio" means the amount (liter) of the aqueous MEA solution which is used for a unit volume ($Nm^3$) of the combustion exhaust gas under the standard conditions.

Also with regard to the number of moles ($CO_2$ loading value) of $CO_2$ absorbed by a unit mole of MEA, a similar tendency appears. That is, when the conditions of the combustion exhaust gas and the concentration of the aqueous MEA solution to be used are kept constant and when the liquid/gas ratio is decreased (or the amount of the aqueous MEA solution is decreased), the $CO_2$ loading value increases. In short, when the liquid/gas ratio is decreased, a reaction ratio between MEA and $CO_2$ is improved.

The present inventors have inspected a relation between the liquid/gas ratios and the $CO_2$ loading values at various concentrations of the aqueous MEA solution, and as a result, they have found that in order to achieve a given loading value, the liquid/gas ratio must be decreased below a certain value, but this value for the liquid/gas ratio decreases as the concentration of the aqueous MEA solution increases.

These facts mean that the amount of the aqueous MEA solution necessary to achieve a given $CO_2$ absorption ratio or a given loading value is smaller than a value that would be indicated if a linear relationship is assumed between the required amount and concentration of the MEA solution, as the concentration of the aqueous MEA solution becomes higher. Therefore, increasing the concentration of the aqueous MEA solution to be used results in significantly larger decreases in the amount of the aqueous MEA solution circulated in the process.

Furthermore, the aqueous MEA solution into which $CO_2$ is absorbed is regenerated in the regenerating column 317. It has been found that the quantity of heat necessary to regenerate a unit amount of MEA can be decreased as the concentration of the aqueous MEA solution becomes higher, under conditions that only the concentration of the aqueous MEA solution is changed, keeping constant other variables such as the loading value of $CO_2$ constant and a $CO_2$ removal ratio. For the regeneration of the aqueous MEA solution, a large amount of heat energy is required, and therefore, as is apparent from the above, sufficient energy saving can be achieved, as the concentration of the aqueous MEA solution is raised.

When $CO_2$ present in the combustion exhaust gas is removed therefrom according to the method of the present invention, a process used is by no means limited to the example shown in FIG. 4. In the process shown in FIG. 4, however, the reflux water of the regenerating column is fed to the $CO_2$ removal column 301 and then brought into contact with the $CO_2$-free combustion exhaust gas, whereby MEA is effectively prevented from escaping from the system together with the $CO_2$-free combustion exhaust gas. Therefore, the process in FIG. 4 can be preferably employed as a process for the method of the present invention. In the process shown in FIG. 4, the combustion exhaust gas is cooled by humidification, but an alternative way can also be used in which the cooling water cooled by the cooler is brought into contact with the combustion exhaust gas. However, according to the process shown in FIG. 4, the temperature of the $CO_2$-free combustion exhaust gas rises, and the gas comes to contain a large amount of an MEA vapor corresponding to this temperature, but the loss of the MEA vapor can be effectively prevented by using the regenerating column reflux water containing $CO_2$. Therefore, a cooler becomes unnecessary for the cooling water, and thus the process in FIG. 4 is advantageous from an economical standpoint.

The third aspect of the present invention will be described in further detail with reference to Experimental Examples 3 and 4.

(EXPERIMENTAL EXAMPLE 3)

Figure 5:
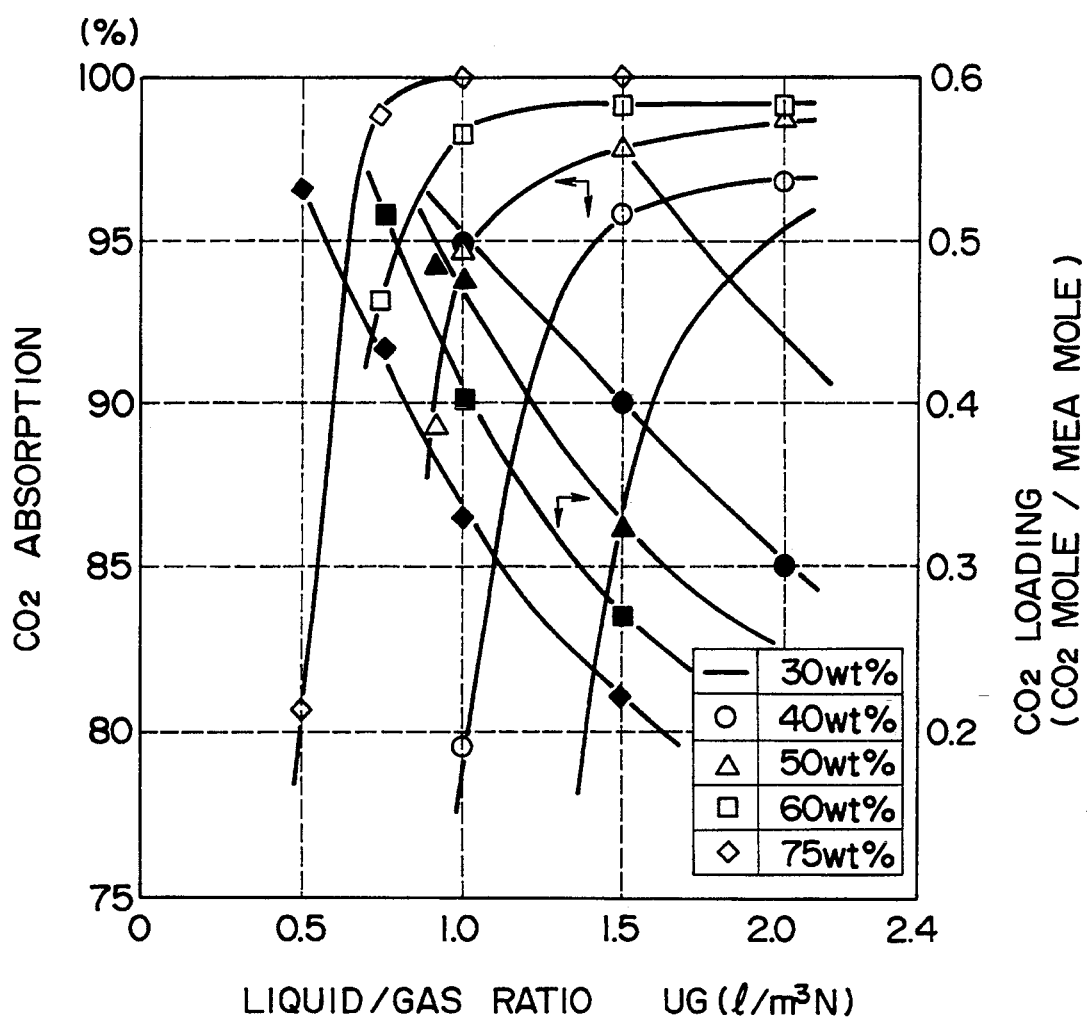
FIG. 5 is a graph showing relations among a liquid/gas ratio, a $CO_2$ absorption ratio and a $CO_2$ loading value at various concentrations of an aqueous MEA solution.

FIG. 5 shows the results of an experiment in which $CO_2$ in a combustion exhaust gas is absorbed by an aqueous MEA solution in a small-scale apparatus of FIG. 4.

That is, FIG. 5 is a graph showing the absorption ratio of $CO_2$ (left ordinate axis, units=%) and $CO_2$ loading value (right ordinate axis, units=$CO_2$ moles/MEA mole) measured with varying liquid/gas ratio (abscissa, units=liters/$m^3N$) under the following experimental conditions using aqueous MEA solutions having various concentrations.

Experimental Conditions

| | |
|---|---|
| Temperature of the combustion exhaust gas to be fed to the $CO_2$ removal column 301: | 60°C. |
| Concentration of $CO_2$ in the same gas: | 9.0–9.2 vol. % |
| Concentration of oxygen in the same gas: | 3.2–3.5 vol. % |
| Flow rate of the same gas: | 2.0 $Nm^3/H$ |
| Temperature of the aqueous MEA solution to be fed to the $CO_2$ removal column 1: | 60°C. |

It is apparent from FIG. 5 that, for example, a value of the liquid/gas ratio necessary to secure an absorption ratio of 95% is 1.9 in the case of the aqueous MEA solution at a concentration of 30%, but it is 0.8 in the case of the aqueous MEA solution at a concentration of 60%, and so in the latter case, the liquid/gas ratio is less than ½ of the former case. Furthermore, in order to secure a loading value of, for example, 0.5, the required liquid/gas ratio is 1.75 in the case of the aqueous MEA solution at a concentration of 30%, but it is 0.8 in the case of the aqueous MEA solution at a concentration of 60%, and hence the latter liquid/gas ratio is less than ½ of the former.

(EXPERIMENTAL EXAMPLE 4)

$CO_2$ was absorbed and recovered from a combustion exhaust gas of an LNG-fired boiler by the use of an apparatus in FIG. 4. In this case, a relation between the concentration of an aqueous MEA solution and the amount of steam necessary for regeneration was inspected keeping a recovery ratio of $CO_2$ constant.

Experimental Conditions

| | |
|---|---|
| Temperature of the combustion exhaust gas to be fed to the $CO_2$ removal column 301: | 60°C. |
| Flow rate of the same gas: | 600 $Nm^3/H$ |
| Concentration of $CO_2$ in the same gas: | 8.56 vol. % |
| Steam used in a regenerating column: Saturated steam of 2.3 $kg/cm^2G$ | |

Figure 6:
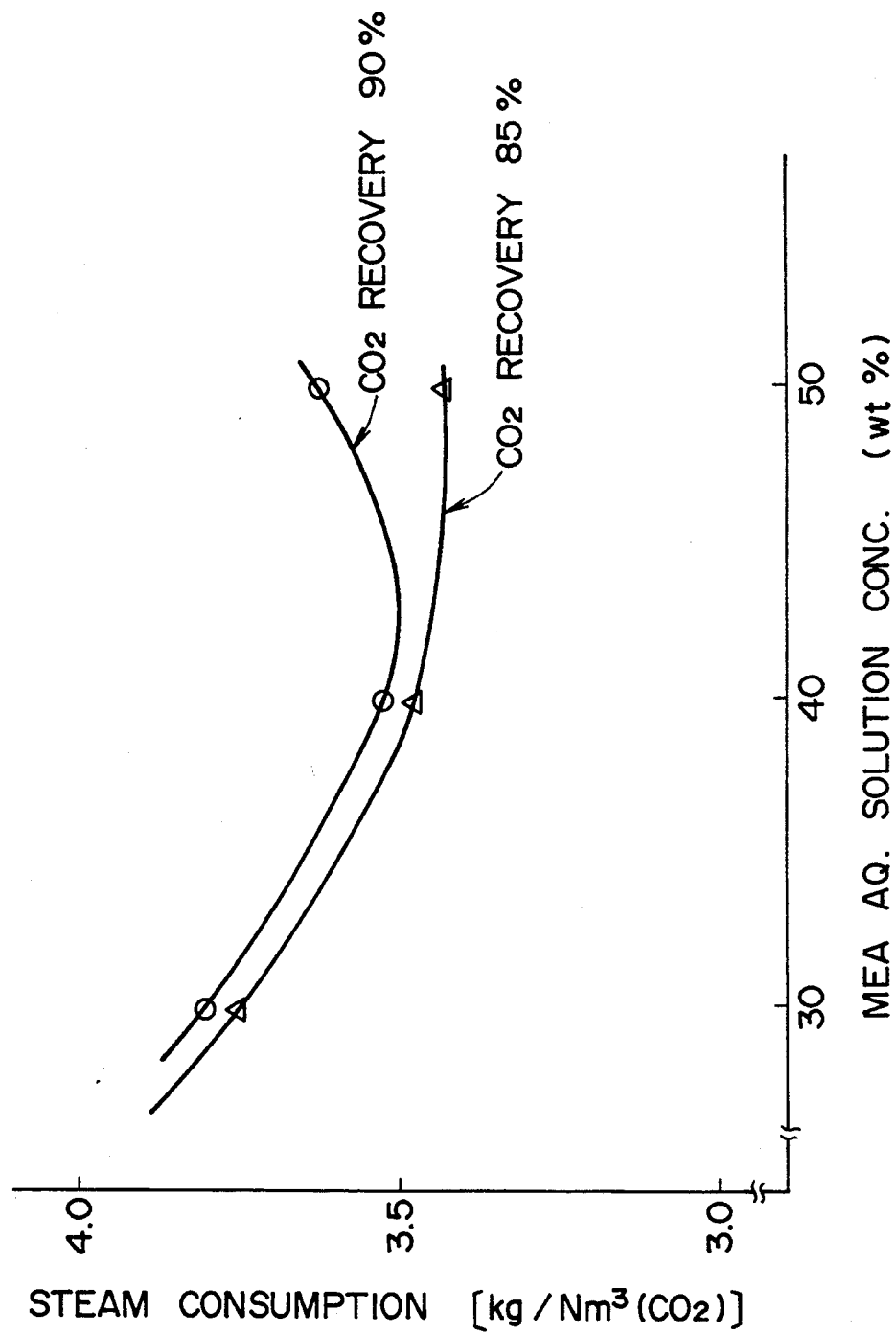
FIG. 6 is a graph showing a relation between the concentration of the aqueous MEA solution and the amount of a steam necessary for regeneration.

The results are set forth in FIG. 6. In FIG. 6, an abscissa axis denotes the concentration of an aqueous MEA solution (% by weight), and an ordinate axis denotes the consumption [$kg/Nm^3$ ($CO_2$)] of a steam necessary for the regeneration. As indicated by FIG. 6, in the case of a recovery ratio of 85%, the consumption of the steam decreases with increases in the concentration of the aqueous MEA solution, and it becomes substantially constant at a concentration of about 50% by weight. With the concentration of the MEA solution being 50% by weight, 8.5% of steam can be saved compared with the case of 30% by weight. In the case of a recovery ratio of 90%, the consumption of the steam decreases with increases in the concentration of the aqueous MEA solution, and when the concentration of the aqueous MEA solution is in excess of 40% by weight, there is a tendency that the consumption of the steam increases again. Thus, when the aqueous MEA solution at a concentration of about 40% by weight is used, the amount of the steam can be decreased as much as 7.8%, as compared with the case where the aqueous MEA solution at a concentration of about 30% by weight is used. Anyway, it can be understood that the concentration of the aqueous MEA solution is preferably 40% or more, more preferably in the range of 40 to 45%.

We claim:

1. A method for treating a combustion exhaust gas, comprising the steps of:
   a) catalytically denitrating a combustion exhaust gas using ammonia as a reducing agent;
   b) removing the carbon dioxide present in said combustion exhaust gas by bringing said combustion exhaust gas into contact with an aqueous alkanolamine solution;
   c) recovering ammonia present in said combustion exhaust gas having been subjected to said carbon dioxide removal by bringing said combustion exhaust gas into contact with water containing carbon dioxide; and
   d) using said recovered ammonia as a reducing agent in said denitrating step.

2. The method claimed in claim 1, wherein said method further comprising the step of desulfurizing said combustion exhaust gas before said carbon dioxide removal step (b).

3. The method claimed in claim 1, wherein ammonia is recovered from said water containing carbon dioxide which has been brought into contact with said exhaust gas by blowing steam into said water.

4. The method claimed in claim 1, wherein said water containing carbon dioxide contains carbon dioxide which is at least at its saturation concentration.

5. The method claimed in claim 4, wherein said water containing carbon dioxide contains 25 ppm or more carbon dioxide.

6. The method claimed in claim 4 wherein said water containing carbon dioxide contains 20 ppm or more carbon dioxide.

7. The method claimed in claim 1 wherein the alkanolamine is selected from a group consisting of monoethanolamine, diethanolamine, triethanolamine, methyldiethanolamine, diisopropanolamine, diglycolamine and aqueous mixtures thereof.

8. The method claimed in claim 7 further comprising removing carbon dioxide present in a combustion exhaust as comprising the step of bringing the combustion exhaust gas into contact with an aqueous monoethanolamine solution under atmospheric pressure wherein said aqueous monoethanolamine solution has a concentration of 35% by weight or more.

9. The method claimed in claim 8 wherein said combustion exhaust gas from which carbon dioxide has been removed by absorption is brought into contact with a water containing carbon dioxide.

* * * * *